United States Patent [19]

Dietrich, Sr. et al.

[11] Patent Number: 4,723,495
[45] Date of Patent: Feb. 9, 1988

[54] SINGLE BLADE SEALER FOR FERTILIZER APPLICATOR

[75] Inventors: William J. Dietrich, Sr., Congerville; Dean A. Knoblock, Goodfield; Cary L. Sizelove, Eureka, all of Ill.

[73] Assignee: DMI, Inc., Goodfield, Ill.

[21] Appl. No.: 876,371

[22] Filed: Jun. 19, 1986

Related U.S. Application Data

[63] Continuation-in-part of Ser. No. 524,905, Aug. 22, 1983, Pat. No. 4,596,199.

[51] Int. Cl.$^4$ ................................................ A01C 7/02
[52] U.S. Cl. ..................................................... 111/85
[58] Field of Search ................. 111/7, 85; 172/572, 172/573, 705, 734, 624, 738, 740, 744

[56] References Cited

U.S. PATENT DOCUMENTS

| | | | |
|---|---|---|---|
| 358,246 | 2/1887 | Arnett . | |
| 404,108 | 5/1889 | Patric et al. | 111/85 |
| 458,371 | 8/1891 | McSherry | 111/85 |
| 486,343 | 11/1892 | Kirkpatrick | 111/85 |
| 516,067 | 3/1894 | Trotter . | |
| 527,621 | 10/1894 | Packham | 111/85 |
| 530,962 | 12/1894 | Packham | 111/85 |
| 536,094 | 3/1895 | Newton . | |
| 557,868 | 4/1896 | Packham | 111/85 |
| 615,727 | 12/1898 | Mast | 111/85 |
| 627,520 | 6/1899 | Packham | 111/85 |
| 672,536 | 4/1901 | Newton . | |
| 882,353 | 3/1908 | Spiers . | |
| 1,084,307 | 1/1914 | Altgelt . | |
| 1,158,110 | 10/1915 | Cook . | |
| 1,901,299 | 3/1933 | Johnson | 111/85 X |
| 2,155,443 | 4/1939 | Parks et al. | 111/85 X |
| 2,155,891 | 4/1939 | Campbell | 111/85 |
| 2,416,189 | 2/1947 | McIntyre | 111/85 |
| 2,443,042 | 6/1948 | Kriegbaum | 111/85 X |
| 2,493,649 | 1/1950 | Alloway . | |
| 2,649,725 | 8/1953 | Oehler et al. | 111/85 X |
| 2,746,371 | 5/1956 | Cook . | |
| 2,760,772 | 8/1956 | McIntyre | 111/85 X |
| 3,148,644 | 9/1964 | Keaton | 111/85 X |
| 3,170,421 | 2/1965 | Norris et al. | 111/7 X |
| 3,306,240 | 2/1967 | Ritchie . | |
| 3,336,885 | 8/1967 | Lebow | 111/85 |
| 4,030,428 | 6/1977 | Truax | 111/85 |
| 4,116,140 | 9/1978 | Anderson et al. | 111/85 X |
| 4,213,505 | 7/1980 | Jolley . | |
| 4,461,355 | 7/1984 | Peterson et al. | 111/7 X |
| 4,466,364 | 8/1984 | Hassenfritz | 111/7 X |

FOREIGN PATENT DOCUMENTS

| 622732 | 6/1961 | Canada | 111/85 |
|---|---|---|---|
| 832431 | 4/1960 | United Kingdom . | |
| 715041 | 2/1980 | U.S.S.R. . | |

Primary Examiner—James R. Feyrer
Assistant Examiner—Danton D. DeMille
Attorney, Agent, or Firm—Emrich & Dithmar

[57] ABSTRACT

A single disc sealer for closing the groove formed by a fertilizer knife is mounted behind the applicator with its cutting edge working immediately adjacent the groove. The work surface has formed in it a raised annular deflection surface spaced inwardly of the periphery of the disc a distance approximately equal to the working depth of the disc. The edge of the disc cuts a ribbon of soil adjacent the furrow, the periphery working surface of the disc displaces the soil laterally toward the groove to close it, and the deflection surface directs the soil down into the furrow rather than lifting the soil as in the case of conventional disc covers, while slightly compacting the soil. The disc mount includes a spring assembly for cushioning the disc and is provided with a plurality of sets of adjusting apertures which provide an adjustable mount for the lower end of the spring assembly for varying disc pressure, and the lower end of the spring assembly may quickly be disassembled from and assembled to one of the plurality of sets of apertures. The spring assembly is mounted off-normal to provide fast recovery following striking of an object by the disc. Slotted brackets allow for adjusting the working angle of the disc and its spacing from the fertilizer furrow.

7 Claims, 6 Drawing Figures

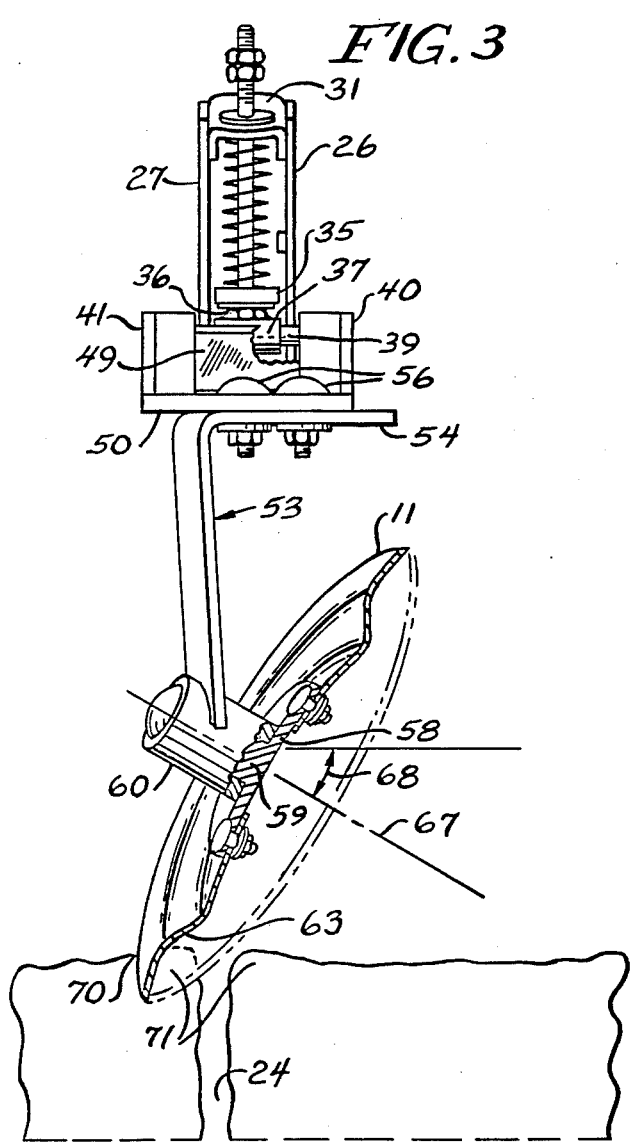
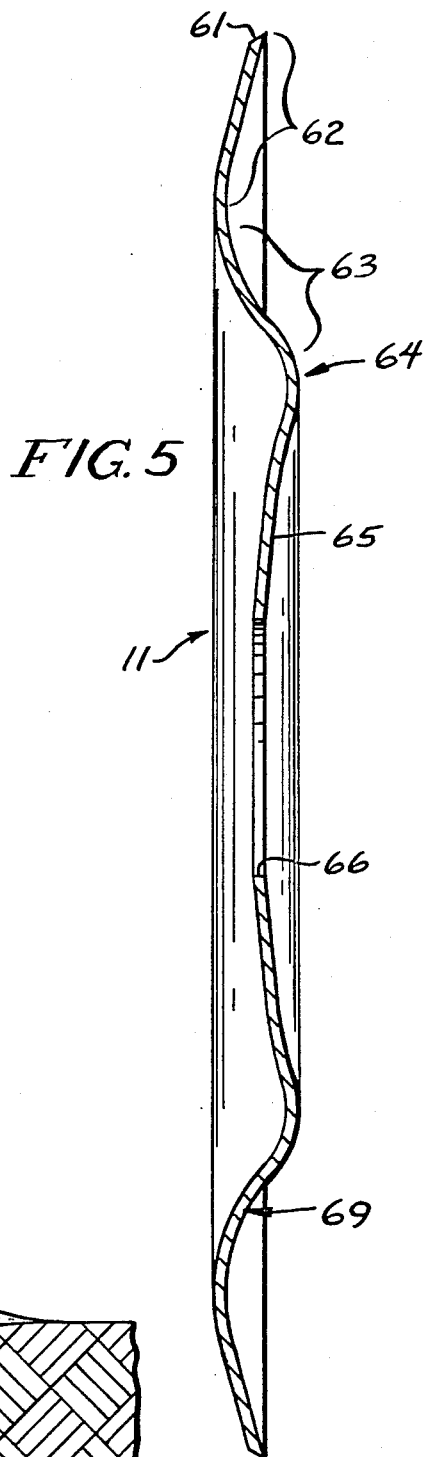
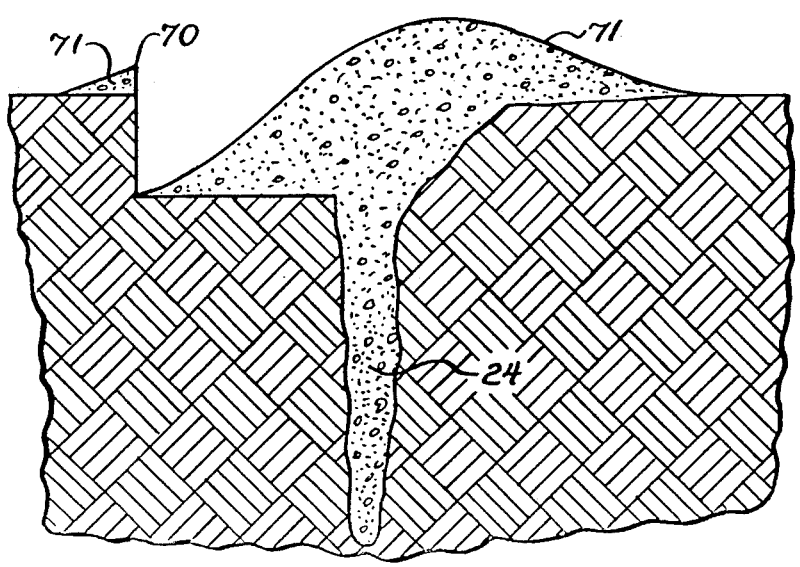

SINGLE BLADE SEALER FOR FERTILIZER APPLICATOR

RELATED APPLICATION

This is a continuation-in-part application of pending application Ser. No. 524,905 filed Aug. 22, 1983 now U.S. Pat. No. 4,596,199.

BACKGROUND OF THE INVENTION

The present invention relates to farm implements and in particular, the present invention is directed to apparatus for adjusting the hold down pressure on a ground engaging tool of an agricultural implement and the like.

It is well known that nitrogen is an essential ingredient of crop fertilizer. It may be applied to the soil in a number of different forms. One common form, widely used in the cornbelt states, is anhydrous ammonia. For economy of materials handling, due to the bulk of material involved, a practice has grown of applying anhydrous ammonia in undiluted form (82% N) in bands or ribbons beneath the soil and then covering the fertilizer to prevent its escape.

Typically, a "knife" in the form of a shank having a width of approximately ¾ in. for forming a narrow groove having a depth of approximately 6–8 inches. A complete apparatus for applying anhydrous ammonia will normally include a number of such individual applicators or knives attached to a large frame. The frame may extend to cover a swath 12 to 40 feet in width, with the individual applicator knives being typically spaced in the range of 18–30 inches. A tube is located behind the knife and extends down to provide a discharge orifice for the anhydrous ammonia in liquid form at the heel of the knife.

Various types of covering or "sealing" devices are used to fill the groove or furrow formed by the knife to prevent the escape of the ammonia gas.

One convenient sealing mechanism is called a "paddle cover". It includes two blades spaced about 8–10 inches apart. Each blade has a general teardrop shape and is curved outwardly and thence inwardly to form converging surfaces centered on the groove formed by the applicator knife. The paddle covers gather soil from the side of the groove and scoop it laterally toward the groove to cover it. The paddle cover is effective where the soil is free from trash or debris, for example, in a field which has been plowed with a moldboard plow previously. A paddle cover does not work as well in a field where conservation tillage is practiced, and it is least effective where minimum tillage or no tillage practices are employed.

Another type of covering device is a double disc sealer which includes two curved blades (generally forming a portion of a sphere or cone) located approximately 10–12 inches apart, and again straddling the applicator groove. The axis of these blades is moved slightly upwardly from the horizontal and slightly forwardly so that the blades are at an acute angle relative to the direction of travel. The blades gather soil, lift it and throw the soil toward the opposing blade. The soil from each blade collides with the soil from the other, and this action, together with the general lifting and throwing action of the blades causes sufficient soil to be thrown in to cover the ammonia deposited at the base of the groove formed by the applicator knife.

The double disc sealer works very well in most soil conditions, but in cloddy fields or fields on which conservation tillage has been employed (leaving root crowns and large corn stalks), the blades, which are pivotally mounted and urged downwardly only under gravity in the usual course, are lifted above the surface of the ground when they engage tough trash, thereby leaving portions in which the fertilizer is not adequately covered in the groove. The use of spring loaded hold down apparatus is the art, but known hold down apparatus provides a fixed hold down force which is not adjustable, and adjustment is desireable to provide optimum operation under different soil conditions or other varying field conditions.

SUMMARY OF THE INVENTION

The present invention provides an apparatus for adjusting the down pressure on a ground engaging tool of an agricultural implement which comprises a mounting assembly adapted to be rigidly mounted to a main frame and including a rearwardly and downwardly extending mounting plate, a pivot frame in the form of a yoke, and means for pivotally mounting the pivot frame to the mounting plate for vertical motion about a pivot axis located beneath the mounting plate. A cushion spring assembly includes a spring bolt extending through the mounting plate and provided at its lower end with a sleeve for fixing the lower end of a cushion spring to the pivot frame. The cushion spring assembly is mounted in an off-normal orientation.

The ground-engaging tool is mounted to the distal end of the pivot frame remote from the connection of the spring cushion assembly thereto, whereby the pivot frame is pivoted upwardly and forwardly about the pivot axis relative to the direction of travel of the implement as the result of the tool striking an object to overcome the force of said spring means and compress the spring means, the free end of the spring means being moved closer to the pivot axis as the spring means is compressed to decrease the moment arm and thus the restoration time of the spring means.

The pivot frame defines a plurality of sets of aligned apertures, each set of apertures defining a horizontal axis and located in the pivot frame to provide different forces about the horizontal pivot axis of the pivot frame when the spring bolt is secured in one of the sets of apertures. A pin is adapted to be received in a corresponding set of apertures in the pivot frame and through the sleeve on the bolt to secure the lower end of the pivot bolt to the pivot frame. The pin is releasably secured to the pivot frame when assembled thereto and to the sleeve of the spring bolt.

The downward force of the cushioning spring may be adjusted for different soil conditions, or the spring force may be eliminated entirely if desired. The apparatus includes a convenient, easy and reliable mount directly to the implement with only two bolts. Convenience of mounting and adjustment are considered important operational features, particularly when it is appreciated that there may be as many as 25 or more such sealers on a large applicator, all of which may have to be adjusted. It will be appreciated that many such large applicators are owned and operated by independent contractors, working on a fee basis for many different farmers, so it is important to be able quickly and conveniently to adjust the shanks for widely varying field conditions and farming practices by the individual farmer-customers. Such adjustments may have to be made on a daily basis.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWINGS

FIG. 3 is a rear view of the apparatus of FIG. 1 with portions of the disc assembly in section;

FIG. 4 is a diagrammatic illustration demonstrating a vertical profile of the soil after the disc has closed and sealed the groove;

FIG. 5 is a cross-sectional view of the sealing disc taken along a diameter of the disc.

DESCRIPTION OF PREFERRED EMBODIMENTS

Figure 1:
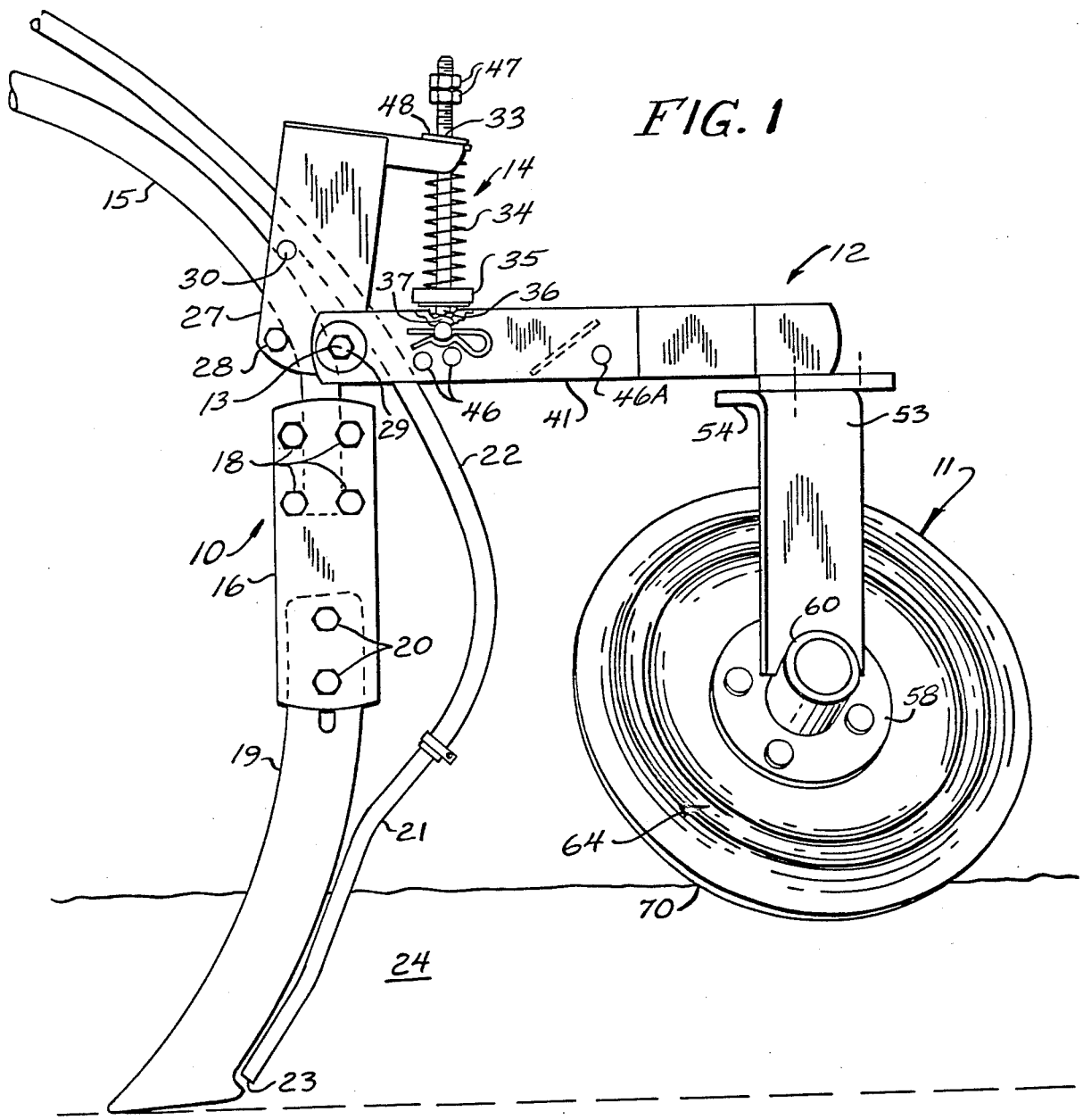
FIG. 1 is a left side elevational view of an applicator knife with the improved spring cushion disc sealer.
Figure 2:
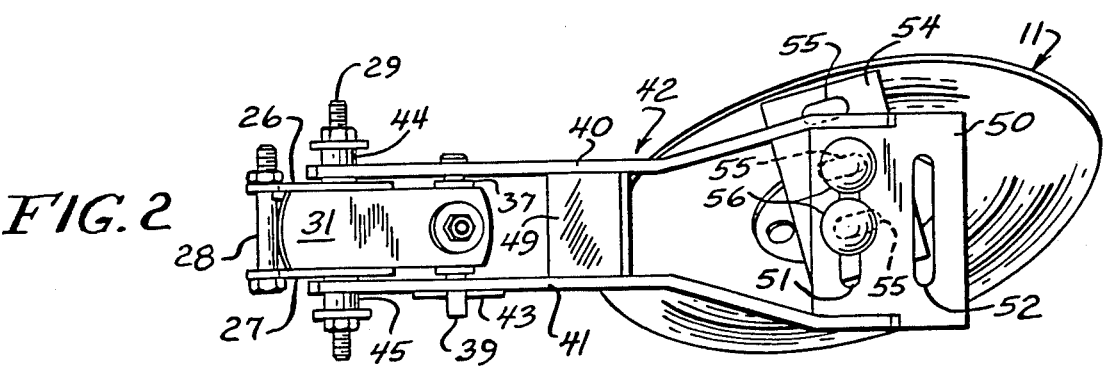
FIG. 2 is a plan view of the apparatus of FIG. 1 with the shank and hose omitted.

Referring first to FIGS. 1 and 2, reference numeral 10 generally designates a fertilizer applicator for forming a groove or furrow in which anhydrous ammonia, in the illustrated embodiment, is deposited. A sealing disc generally designated 11 is mounted by means of a mounting assembly generally designated 12 to trail behind the applicator 10. The mounting assembly 12 and disc 11 are free to rotate about an axis 13, and a spring assembly generally designated 14 urges the disc 11 into working relation with the ground.

The applicator 10 is of conventional design. It includes a curved spring shank 15 to the bottom of which are mounted a pair of plates, one of which is designated 16 in FIG. 1, by means of bolts 18. A knife 19 is secured between the plates 16 by bolts 20. A tube 21 is welded to the rear of the knife 19, and anhydrous ammonia is fed to the applicator tube 21 by means of a flexible hose 22 which is clamped to the upper end of the tube 21. The lower end of the applicator tube 21 provides a discharge orifice 23 at which the anhydrous ammonia is released and deposited in the base of a furrow generally designated 24 which is formed by the knife 19.

Typically, a plurality of applicator knives similar in structure to that just described are mounted by means of their spring shanks to a frame at desired lateral spacings. Such spacings may range from 18 inches to 30 inches or more depending upon the farming practices of the operator. The frame may be either mounted directly to the three-point hitch of the tractor or it may be of the drawn type, having its own support wheels. Wider machines normally have provisions for folding the wings for transport.

Turning now to the mounting assembly 12, it includes a pair of side mounting plates 26, 27 (see FIG. 2) which are spaced apart and engage opposite sides of the shank 15. The plates 26, 27 are secured together by a forward bolt 28 and a rear bolt 29 which forms the base of a pivot assembly which defines the previously mentioned pivot axis 13. The bolts 28, 29 are located respectively forwardly and rearwardly of the shank 15. One or both of the plates 26, 27 may be provided with a detent (see the detent 30 for the plate 27 in FIG. 1) which cooperates with the mounting bolts 28, 29 to hold the mounting plates 26, 27, and hence the entire mounting assembly 12, to the applicator shank 15.

An inverted channel member 31 is welded to the top of the plates 26, 27 and extends rearwardly and generally downwardly thereof to provide a mount for the spring cushion assembly 14. Specifically, the rear portion of the horizontal web of the channel 31 is apertured to receive a spring retaining bolt 33 which extends downwardly through the center of a coil spring 34, the bottom of which is received in a cup washer 35. The head of the bolt 33 is designated 36 in FIG. 1, and its lower surface has welded to it a sleeve or bushing 37 which extends transverse of the direction of travel of the implement and receives a pin 39. The pin 39, in turn, is received in a pair of aligned apertures formed in the side members 40, 41 of a yoke generally designated 42, and the pin 39 forms the lower pivot mounting of the spring cushion assembly 14, as will be further explained below. The pin 39 is held in place on one side by the head of the pin, and on the other side by a clip pin 43.

As best seen in FIG. 2, the forward portions of the side members 40, 41 of the yoke 42 are journalled on sleeves or bushings 44, 45 respectively. The sleeves 44, 45, in turn, are received on the bolt 29 and held against the side plates 26, 27 respectively by washers and nuts threaded on the bolt 29. Thus, the yoke 24 is mounted for pivotal motion in a vertical plane about the axis 13. However, the yoke 42 is urged downwardly by means of the spring assembly 14; and the downward force may be adjusted by placing the pin 39 in one of three sets of aligned apertures 46 which are formed in the side members 40, 41.

A fourth aperture 46A is provided for storing the pin 39 in the case where it is not desired to provide a downward bias on the disc 11, and in that configuration, gravity alone produces the downward force in the use position of the disc sealer.

The lower limit position for the disc sealer is defined by a pair of locked nuts 47 received on the spring bolt 33 which engage a washer 48 on top of the channel 31.

The central section of the side members 40, 41 of the yoke 42 are strengthened by a cross brace 29; and the rear portions of those members have welded to their undersides a horizontal plate 50 having a forward transverse slot 51 and a rear transverse slot 52.

An angled mounting bracket 53 includes an upper horizontal plate 54 which underlies the slotted plate 50. The plate 54 includes three parallel slots 55 which extend in the general direction of the sealing disc 11 and generally transverse to the slots 51, 52. Two bolts 56 are received in one of the slots 51, 52 and two different ones of the slots 55 for mounting the angle mounting bracket 53 to the yoke 42 as best seen in FIG. 3.

The disc 11 is mounted to a central flange 58 which includes a journal 59 rotatably received in a hub 60. The hub 60 is welded to the bottom of the mounting bracket 53 as seen in FIGS. 1 and 3.

Turning now to FIG. 5, the disc 11 preferably takes the form of a blade having a sharpened edge 61. The outermost annular portion of the blade designated in FIG. 5 by the bracketed region 62 conforms to a generally spherical profile of similar conventional concave discs used in the agricultural industry of similar size, although it may also be conical, as persons skilled in the art will appreciate. The function of the annular outer portion 62 of the disc is to cut the soil and displace it laterally to close the furrow or groove. Typically, for closing the groove formed by an ammonia applicator knife, the disc 11 has a diameter of 12-14 in. Inwardly of the annular outer portion 62, the blade is formed inwardly (i.e., toward the center of the sphere) to form a deflecting surface or portion generally indicated in the region of the bracket 63 in FIG. 5. The inner portion of the deflection section 63 is sometimes referred to as a ridge, as illustrated at 64. Inwardly of the ridge 64, the disc is formed into a web 65 which has no function in operation other than supporting the working portions of the disc. The web 65 is apertured a 66 for receiving the mounting flange 58.

It will be understood from observation of FIG. 5 that the closing surface 62 and the deflecting surface 63 are formed in smooth conformation so that no sharp recesses are formed. This provides a self-scouring or cleaning action in use and avoids soil build-up even in moist soil. When proceeding along any radial line from the edge 61 to the center of the disc (e.g., top to bottom in FIG. 5), the closing surface 62 extends to the left in one direction relative to the axis which is parallel to the plane of the page, and then there is a smooth transition and the deflecting surface extends toward the right which is the opposite axial direction.

Turning now to FIG. 3, the axis of rotation of the disc 11 is designated 67, and it preferably forms an angle (indicated by the arrow 68) relative to the horizontal of approximately 25°. This is sometimes referred to as the horizontal tilt angle, and it is not critical to the operation of the unit and is related to the shape of the compacting portion 63 of the disc, as will be understood from a description of the operation of the disc. The axis of rotation 67 also forms an angle of approximately 10°-15° relative to a vertical plane transverse of the direction of travel of the apparatus. That is, the axis of rotation 67 is moved forwardly so that the inner or "work" surface of the disc (designated 69 in FIG. 5) forms a working angle of approximately 10°-15°. The term "working angle" is used commonly in disc plows or the like to refer to the included angle between a plane transverse of the direction of travel of the implement and the axis of rotation of the disc. This assumes, of course, that the axis of rotation of the disc is horizontal, so in the present case, the definition is modified to allow for the horizontal tilt angle of the disc.

In operation, the disc enters the soil at the point 70 (see FIGS. 1 and 3); and because of the working angle of the disc, that point on the periphery of the disc will be urged toward the groove or furrow 24 as the apparatus moves forward (to the left in FIG. 1). In other words, as the knife 19 passes through the soil, it forms the groove 24 by pushing soil to the side, thereby causing small berms 71 to be formed on either side of the opening of the groove. As best illustrated in FIG. 4, then, the outer edge of the disc "bites" into the berm 71 on the left side of the groove 24 and cuts partly into undisturbed soil, moving the loose soil and some previously undisturbed soil into the groove 24 and breaking down at least the top of the left wall of the groove to fill it by laterally displacing that soil. Cooperatively, the deflecting surface 63 of the disc forces the displaced soil downwardly into the groove slightly compacting the soil. The shape of the deflecting surface 63 is related to the tilt angle of the disc. In the case of a 25° tilt angle, the average angle of the deflecting surface 63 relative to a line perpendicular to the axis of the disc is in the range of 20°-35°. Thus, depending on the shape of the deflecting surface 63, the horizontal tilt angle of the disc may be in the range of 20°-35°.

More important than the actual angle configuration of the deflecting surface 63 is the fact that in the working position, the deflecting surface 63 is located slightly above the surface of the soil, and in operation, it directs the soil downwardly into the groove, rather than throwing the soil outwardly as in the case of a conventional spherical disc.

It will also be observed from FIG. 4 that the location of the disc 11 is such to at least partially traverse the groove so that the trailing edge of the disc exits the soil in the region generally above or only slightly to the side of the groove itself. This is in contradistinction to the comparatively widely spaced twin disc sealers known in the art. The final profile left by the single disc sealer is diagrammatically shown in somewhat idealized form in FIG. 4; and it is characterized by a single, rather shallow furrow and reduced berm height, thereby provided a more even final profile than conventional twin disc sealers or paddle covers. Further, because the disc 11 rotates, it has the advantage of performing well at higher speeds and reduces the possibility of accumulating trash; and because of the various structural relationships described above, the operation of the disc sealer of the present invention performs well over a wide range of speeds as well as a wide range of field conditions (from deep plowing to minimum or no-tillage conditions), and a wide range of soil and moisture conditions. The use of only one disc further promotes trash clearance.

Operation in trashy or cloddy conditions is further enhanced by the spring cushion assembly 14 which increases the downward force on the disc 11 and enables quicker reaction in passing over root crowns, heavy trash or the like. As mentioned, the lateral position of the disc sealer may be adjusted within one of the slots 51, 52 (the rear slot being used with an additional fertilizer conduit, for example, for depositing potash) is interposed forward of the tube 21; and the slots 55 may be used to adjust the working angle of the disc. In the latter regard, an increased working angle will provide a greater bite and displace more soil.

Although in FIG. 3, the disc blade is shown on the left side of the groove 24, it can readily be reversed to operate in a similar fashion on the right side of the groove. Thus, if twelve applicators are used on a single frame, six sealers may operate on the left side of the furrow and six on the right side of their respective furrows to provide symmetrical operation and to offset any lateral force caused by the discs.

In summary, the outer periphery of the disc is sharpened to provide a good cutting edge and to achieve a "bite" into the soil. The outer annular portion 62, because of its generally concave shape and the working angle of the disc, gathers soil and displaces it laterally toward the groove to fill the groove at least partially. The deflecting surface 63 directs loose soil from the berm formed by the knife as well as soil loosened and displaced by the annular portion 62 of the blade downwardly into the groove in a slight compacting action. It will be appreciated that in operation, the average angle of the compacting portion 63 is very shallow—approximately 10°-15° above the horizontal so that some compacting is assured at the top of the groove.

Figure 6:
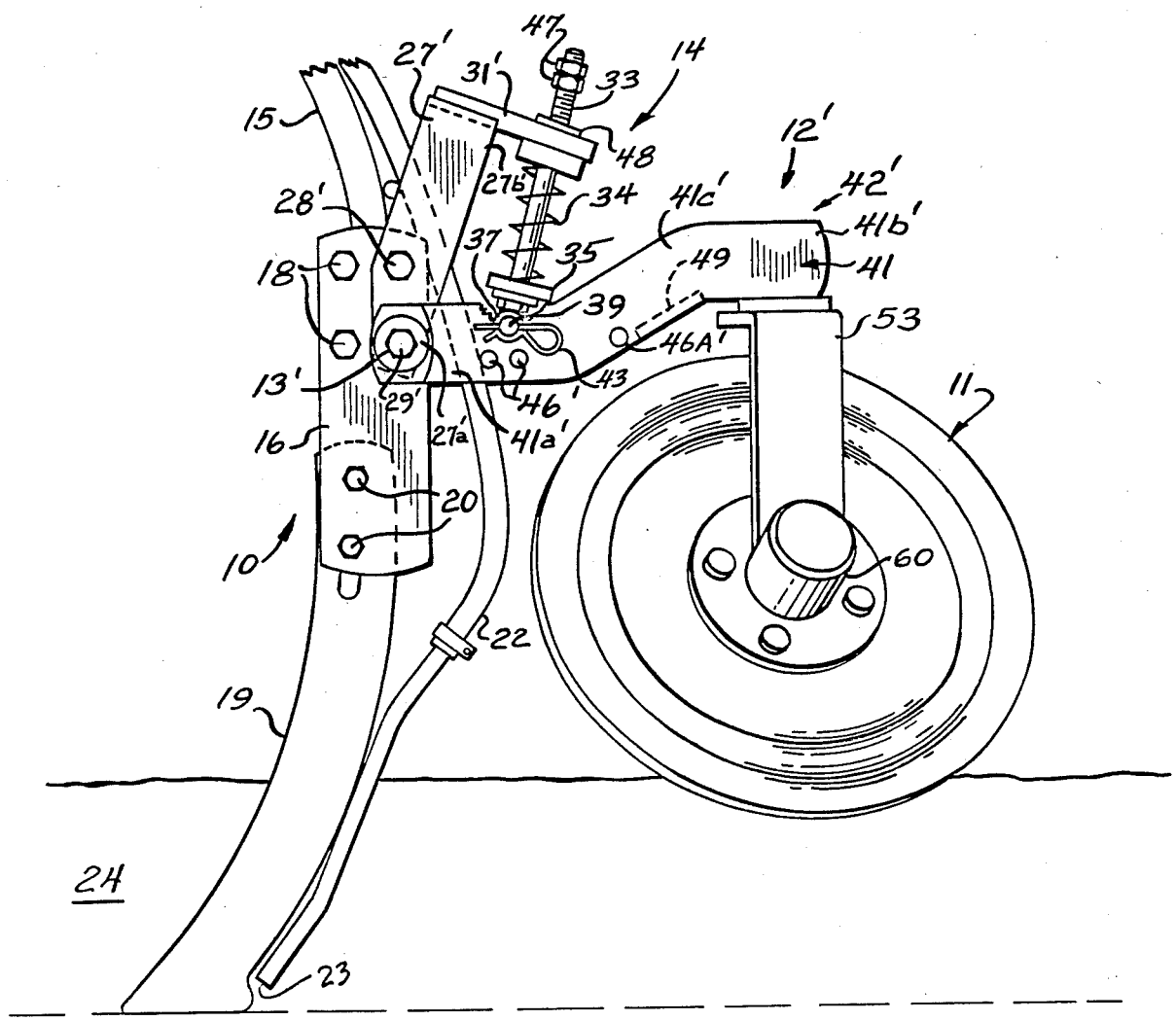
FIG. 6 is a left side elevational view of a further embodiment of an applicator knife with the improved spring cushion disc sealer.

Referring to FIG. 6, there is illustrated a further embodiment of a mounting assembly generally designated 12' for mounting sealing disc 11 to trail behind the fertilizer applicator 10. The mounting assembly 12' is similar to the mounting assembly 12 described above with reference to FIGS. 1–3, and accordingly corresponding elements have been given the same reference number with a prime notation. The mounting assembly 12' and disc 11 are free to rotate about an axis 13', and spring assembly 14 urges the disc 11 into working relation with the ground.

In the mounting assembly 12', the pivot assembly is located lower along the shank 15 such that the pivot axis 13' is lower than the pivot axis 13 for the previously described mounting assembly 12. In one realization, the pivot axis 13' was approximately four inches lower than pivot axis 13. Additionally, mounting assembly 12' mounts the spring cushion assembly 14 tilted off normal, resulting in a reduction in the cushion spring restoration time as will be shown.

More specifically, the mounting assembly 12' includes a pair of side mounting plates, only one 27' of which is shown, which are spaced apart and engage opposite sides of the shank 15, secured together and mounted to plates (such as plate 16) by a bolt 28' and bolt 29'. Bolt 29' forms the base of a pivot assembly which defines the previously mentioned pivot axis 13'. The bolts 28' and 29', which are located rearwardly of the shank 15, and bolts 18, which are located forwardly of shank 15, hold the plates, such as plate 16, and hence the entire mounting assembly 12' to the applicator shank 15.

An inverted channel member 31' is welded to the top of both side plates, such as side plate 27' and extends rearwardly and generally downwardly thereof to provide an inclined mount for the spring cushion assembly 14 in the manner of the channel 31 of the mounting assembly 12 as described above with reference to FIG. 1. The locking pin 39 is received in a pair of aligned apertures formed in a pair of side members, such as side member 41', of a yoke generally designated 42', and the pin 39 forms the lower pivot mounting of the spring cushion assembly 14. The pin 39 is held in place on one side by the head of the pin, and on the other side by a clip pin 43.

Each side mounting plate, such as side mounting plate 27' is generally rectangular in shape having a lower mounting end 27a', and an upper end 27b'. Mounting end 27a' defines a pair of mounting apertures which receive bolts 28', 29' for securing the plates 27', and the other side mounting plate (not shown) to the shank 15. The upper end 27b' extends upwardly and rearwardly defining at its side edge, an inclined mounting surface for channel member 31'. Thus, channel member 31' mounts the spring assembly tilted off normal at an angle in the range of 15 to 25 degrees, preferably, approximately 20 degrees off normal.

Each side member of the yoke 42', such as side member 41', has its forward end portion 41a' offset relative to rearward end portion 41b', the end portions interconnected by inclined center portion 41c'.

Because the lower pivot 13' locates the hub 60 closer to the pivot axis 13', the hub 60 swings more vertical than fore and aft. This permits the disc 11 to be mounted closer to the knife 19. Also, the supplemental mounting slot 52 (FIG. 2) is not required with this modified mounting arrangement.

As described above for side members 40, 41 of mounting assembly 12 (FIG. 2), the forward end portions of the side members of the yoke 42', are journalled on sleeves or bushings, which in turn, are received on the bolt 29' and held against the side plates by washers and nuts threaded on the bolt 29'. Thus, the yoke 42' is mounted for pivotal motion in a vertical plane about the axis 13'. However, the yoke 42' is urged downwardly by means of the spring assembly 14; and the downward force may be adjusted by placing the pin 39 in one of three sets of aligned apertures 46' which are formed in the two side members. The rearward end portions mount the sealing disc in the manner described above with reference to FIGS. 1–3.

A fourth aperture 46A' is provided for storing the pin 39 in the case where it is not desired to provide a downward bias on the disc 11, and in that configuration, gravity alone produces the downward force in the use position of the disc sealer.

The lower limit position for the disc sealer is defined by a pair of locked nuts 47 received on the spring bolt 33 wich engage a washer 48 on top of the channel 31'.

When the disc 11 strikes an object in its path, the yoke 42' is pivoted upwardly and forwardly in the direction of the travel, once the bias force of the spring 34 is overcome, compressing the spring 34. With the cushion spring assembly 14 mounted oriented tilted off normal, the pivoting of the yoke 42', in response to the disc striking an object, causes the free end of the cushion spring to be moved closer to the pivot axis 13'. The spring force, caused by the compression of the spring remains the same as for the mounting assembly 12, but the moment arm is decreased, decreasing the moment, with an attendant decrease in the time for the spring to restore after it has been compressed as a result of the disc striking an object.

Thus, the amount of spring bias force applied to the disc is adjustable by placing the pin 39 in one of the three sets of aligned apertures 46 in the side members. The lower pivot axis 13' and the off-normal mounting of the spring cushion assembly 14 afforded by the mounting assembly 12' provides a shorter moment arm resulting in fast recovery following striking of an object by the disc.

Having thus disclosed in detail preferred embodiments of the invention, persons skilled in the art will be able to modify certain of the structures which have been described and to substitute equivalent elements for those disclosed while continuing to practice the principle of the invention; and it is, therefore, intended that all such modification and substitutions be covered as they are embraced within the spirit and scope of the appended claims.

We claim:

1. An improved adjustable cushion furrow closer for a fertilizer applicator having a shank carrying an applicator knife for forming a furrow for fertilizer, said improved closer comprising: mounting means rigidly mounted to said shank and including a mounting plate extending behind said shank; a pivot frame in the form of a yoke and having first and second spaced side plates; first means for pivotally mounting said pivot frame to said mounting means for vertical motion about a pivot axis located beneath said mounting plate; cushion spring means including a spring bolt extending through said mounting plate and provided at its lower end with a sleeve for rotatably mounting the lower end of said cushion spring means to said pivot frame, the side plates of said pivot frame including a plurality of sets of aligned apertures, said side plates being spaced to receive said sleeve of said spring bolt, each set of apertures defining a horizontal axis and located in said pivot frame to adjust the down pressure on said pivot frame in the normal position when said sleeve of said spring bolt is secured in one of said sets; a securing pin having an enlarged head on one end and a threadless shank received in a corresponding set of apertures in said pivot frame and through the sleeve on said spring bolt to secure the lower end of said spring bolt to said pivot frame; removable threadless clip means for releasably securing said securing pin to said pivot frame in an associated set of apertures when the same is assembled thereto and to said sleeve of said spring bolt; ground engaging furrow closing means; second means for mounting said furrow closing means to the distal end of said pivot frame remote from the connection of said cushion spring.

2. The apparatus of claim 1, wherein said pivot frame extends generally horizontal rearward of said mounting means in the normal position of said closing means; said spring means being in compression between said mounting plate and the lower portion of said spring bolt, the upper portion of said spring bolt extending through said mounting plate and having an upper threaded end; lock nut means on the upper threaded end of said spring bolt for limiting the downward location of said pivot frame relative to said mounting plate.

3. The apparatus of claim 1, wherein said sets of aligned apertures each define an horizontal axis having different heights from the axis of rotation of said pivot frame.

4. The apparatus of claim 1, wherein said sets of aligned apertures each define respective horizontal axes spaced at different elevation relative to the axis of rotation of said pivot frame.

5. The apparatus of claim 1, wherein said furrow closing means comprises at least one rotating disc spaced to the side of a furrow formed by said knife for closing the same as the apparatus moves forward.

6. The apparatus of claim 1, wherein said first means for pivotally mounting said pivot frame to said mounting means provides a pivot axis for said pivot frame behind said shank; and wherein said mounting plate extends downwardly and rearwardly behind said shank to provide an upper seat for said cushion spring means.

7. The apparatus of claim 5 wherein said pivot frame extends rearwardly of said first means and thence upwardly and rearwardly for receiving said furrow closing means, whereby the pivot axis of said pivot frame is more closely horizontally aligned with the pivot axis of said closing means such that the initial displacement of the axis of said closing means is in a more vertical direction providing a quicker response.

* * * * *